US012697929B2

(12) United States Patent
Wu et al.

(10) Patent No.: US 12,697,929 B2
(45) Date of Patent: Aug. 4, 2026

(54) TUNNEL GUIDING STRUCTURE FOR STOP LAMP WIRING HARNESS

(71) Applicant: FCA US LLC, Auburn Hills, MI (US)

(72) Inventors: Kai Wu, Shanghai (CN); Xinyu Zhang, Shanghai (CN); Minxian Liu, Shanghai (CN); Yan Liu, Shanghai (CN); Chunmei Fan, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 367 days.

(21) Appl. No.: 18/515,635

(22) Filed: Nov. 21, 2023

(65) Prior Publication Data

US 2025/0162524 A1     May 22, 2025

(51) Int. Cl.
| | |
|---|---|
| B60R 16/02 | (2006.01) |
| B60Q 1/44 | (2006.01) |
| B62D 35/00 | (2006.01) |
| B60J 5/10 | (2006.01) |
| B60Q 1/30 | (2006.01) |

(52) U.S. Cl.
CPC ............ B60R 16/0215 (2013.01); B60Q 1/44 (2013.01); B62D 35/007 (2013.01); B60J 5/101 (2013.01); B60Q 1/302 (2013.01)

(58) Field of Classification Search
CPC ...... B60R 16/0215; B60Q 1/44; B60Q 1/302; B62D 35/007; B60J 5/101
See application file for complete search history.

(56) References Cited

U.S. PATENT DOCUMENTS

| | | | | |
|---|---|---|---|---|
| 10,308,293 | B2 * | 6/2019 | Khayat | B62D 35/007 |
| 10,780,927 | B2 * | 9/2020 | Prabhakar | B60R 11/04 |
| 10,787,066 | B2 * | 9/2020 | Bret | B60Q 1/2619 |
| 11,491,910 | B2 * | 11/2022 | Funahashi | B60Q 1/302 |
| 12,377,793 | B2 * | 8/2025 | Lamprey | B60R 1/26 |
| 12,522,158 | B2 * | 1/2026 | Mizuno | B60R 16/0207 |
| 2019/0054855 | A1 * | 2/2019 | Krishnan | B60Q 1/2661 |
| 2025/0229849 | A1 * | 7/2025 | Rupp | B60Q 1/30 |
| 2025/0263138 | A1 * | 8/2025 | Kruse | B62D 35/008 |

FOREIGN PATENT DOCUMENTS

| | | | | | | |
|---|---|---|---|---|---|---|
| CN | 115158494 | A | * | 10/2022 | .......... | B62D 35/007 |
| DE | 102021203267 | B3 | * | 6/2022 | .......... | H02G 15/013 |
| EP | 3495183 | A1 | * | 6/2019 | .......... | B62D 35/007 |
| FR | 3087739 | A1 | * | 5/2020 | ............ | B62D 65/16 |
| JP | H0858638 | A | | 3/1996 | | |
| JP | H08188183 | A | | 7/1996 | | |
| JP | 2009-029241 | A | | 2/2009 | | |
| KR | 20160034026 | A | * | 3/2016 | ............ | B62D 25/06 |

* cited by examiner

*Primary Examiner* — Jason S Morrow
(74) *Attorney, Agent, or Firm* — Jeremy J. Klobucar

(57) ABSTRACT

A tailgate for a vehicle including a tailgate inner panel and a stop lamp assembly. The stop lamp assembly includes a stop lamp and a stop lamp wiring harness configured to provide electricity to the stop lamp. The stop lamp assembly is configured to mate with the tailgate inner panel. The tailgate inner panel includes a first opening and a second opening in communication with each other via an enclosed tunnel structure configured for receipt of the stop lamp wiring harness.

9 Claims, 8 Drawing Sheets

TUNNEL GUIDING STRUCTURE FOR STOP LAMP WIRING HARNESS

FIELD

The present disclosure relates to a tunnel guiding structure for a stop lamp wiring harness.

BACKGROUND

This section provides background information related to the present disclosure which is not necessarily prior art.

Referring to FIGS. 1 and 2, a portion of a vehicle 10 is illustrated. Specifically, in FIG. 2, a tailgate 11 of vehicle 10 is illustrated. Tailgate 11 includes an upper spoiler 14. In additional to its tail lamps 13, vehicle 10 may include a stop lamp assembly 16 (FIG. 2) that illuminates upon actuation of the brakes of the vehicle 10 to indicate that the vehicle 10 is braking or coming to a stop. Stop lamp assembly 16 may include a lower spoiler body 18 that mates with upper spoiler 14, a stop lamp 20, and a stop lamp wiring harness 22 that engages with a main wiring harness (not shown) located within the body 12 of the vehicle 10 to provide electricity to stop lamp 20.

Now referring to FIG. 3, it can be seen that upper spoiler 14 and lower spoiler body 18 are connected to a tailgate inner panel 24 of vehicle 10. To connect stop lamp wiring harness 22 of stop lamp assembly 16 to the main wiring harness (not shown) located within body 12 of vehicle 10, the stop lamp wiring harness 22 must be passed through a pair of apertures 26 and 28 located in tailgate inner panel 24. Thus, when vehicle 10 is being manufactured, an operator must first pass the stop lamp wiring harness 22 through the first aperture 26 and then the second aperture 28 before attaching the lower spoiler body 18 to the tailgate inner panel 24. Inasmuch as the second aperture 28 is not visible to the operator during this process, this process is not very efficient as the operator may be required to take an inordinate amount of time to locate and pass the stop lamp wiring harness 22 through the second aperture 28 before it can be mated with the main wiring harness (not shown) located within the body 12 of vehicle 10. Indeed, as shown in FIG. 3, there is an open space 30 located between the first aperture 26 and the second aperture 28 that the stop lamp wiring harness 22 can travel into that may make locating the second aperture 28 difficult.

SUMMARY

This section provides a general summary of the disclosure and is not a comprehensive disclosure of its full scope or all of its features.

According to a first aspect of the present disclosure there is provided a tailgate for a vehicle. The tailgate includes a tailgate inner panel; and a stop lamp assembly including a stop lamp and a stop lamp wiring harness configured to provide electricity to the stop lamp, the stop lamp assembly configured to mate with the tailgate inner panel, wherein the tailgate inner panel includes a first opening and a second opening in communication with each other via an enclosed tunnel structure configured for receipt of the stop lamp wiring harness.

According to the first aspect, the enclosed tunnel structure is defined by a plurality of barrier walls that define a pathway for the stop lamp wiring harness to pass through the tailgate inner panel.

According to the first aspect, the barrier walls include an upper wall and a lower wall that are connected to each other by a pair of sidewalls.

According to the first aspect, the tailgate may also include an upper spoiler connected to the tailgate inner panel.

According to the first aspect, the stop lamp assembly includes a lower spoiler body that mates with the upper spoiler.

According to the first aspect, the stop lamp wiring harness includes a rigid, yet flexible cable attached to the stop lamp.

According to the first aspect, the tailgate inner panel includes a body defining an elongated recess configured for receipt of the stop lamp assembly.

According to a second aspect of the present disclosure, there is provided a vehicle that includes a tailgate. The tailgate includes a tailgate inner panel including an upper section and a lower section; an upper spoiler attached to the upper section; a lower exterior panel connected to the lower section; and a stop lamp assembly including a stop lamp and a stop lamp wiring harness configured to provide electricity to the stop lamp, the stop lamp assembly configured to mate with the upper section, wherein the upper section of the tailgate inner panel includes a first opening and a second opening in communication with each other via an enclosed tunnel structure configured for receipt of the stop lamp wiring harness.

According to the second aspect, the enclosed tunnel structure is defined by a plurality of barrier walls that define a pathway for the stop lamp wiring harness to pass through the tailgate inner panel.

According to the second aspect, the barrier walls include an upper wall and a lower wall that are connected to each other by a pair of sidewalls.

According to the second aspect, the stop lamp assembly includes a lower spoiler body that mates with the upper spoiler.

According to the second aspect, the stop lamp wiring harness includes a rigid, yet flexible cable attached to the stop lamp.

According to the second aspect, the upper section of the tailgate inner panel includes a body defining an elongated recess configured for receipt of the stop lamp assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 4:
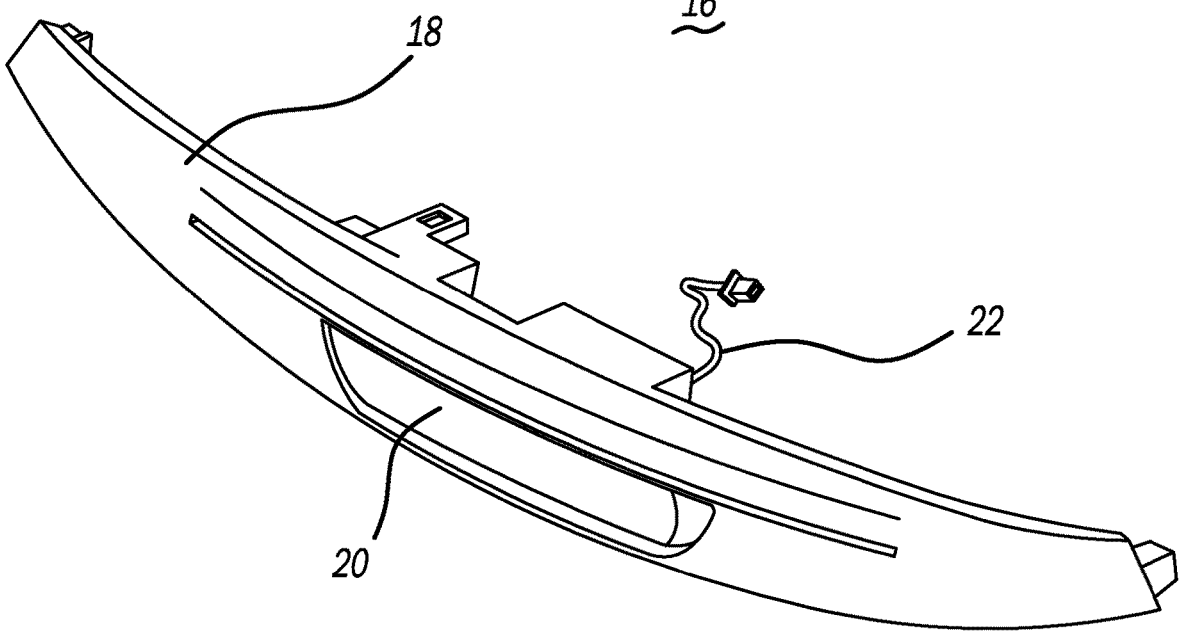
FIG. 4 is a perspective view of a stop lamp assembly according to a principle of the present disclosure.
Figure 6:
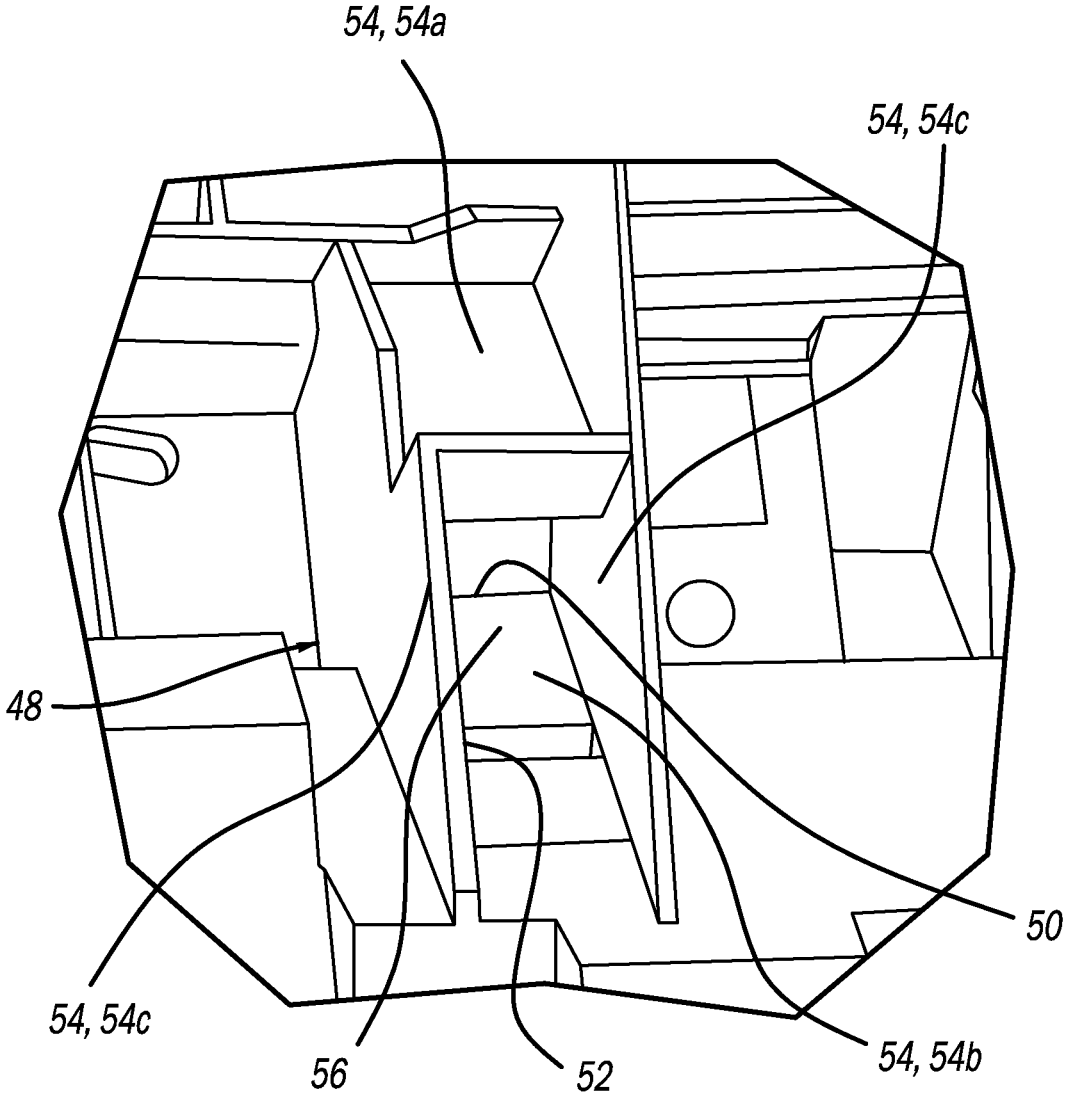
FIG. 6 is an enlarged perspective view of the encircled portion of FIG. 5.
Figure 7:
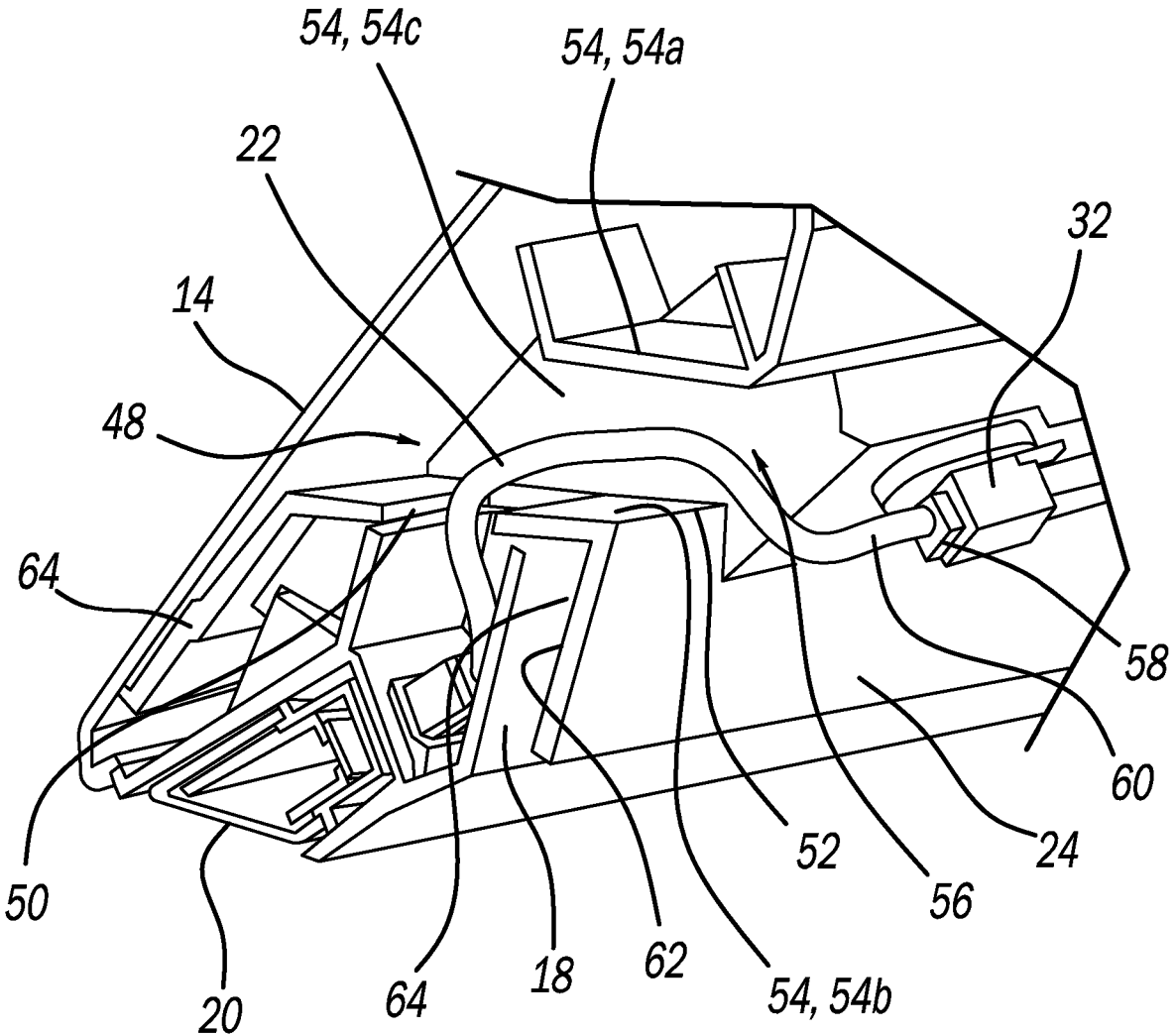
Figure 8:
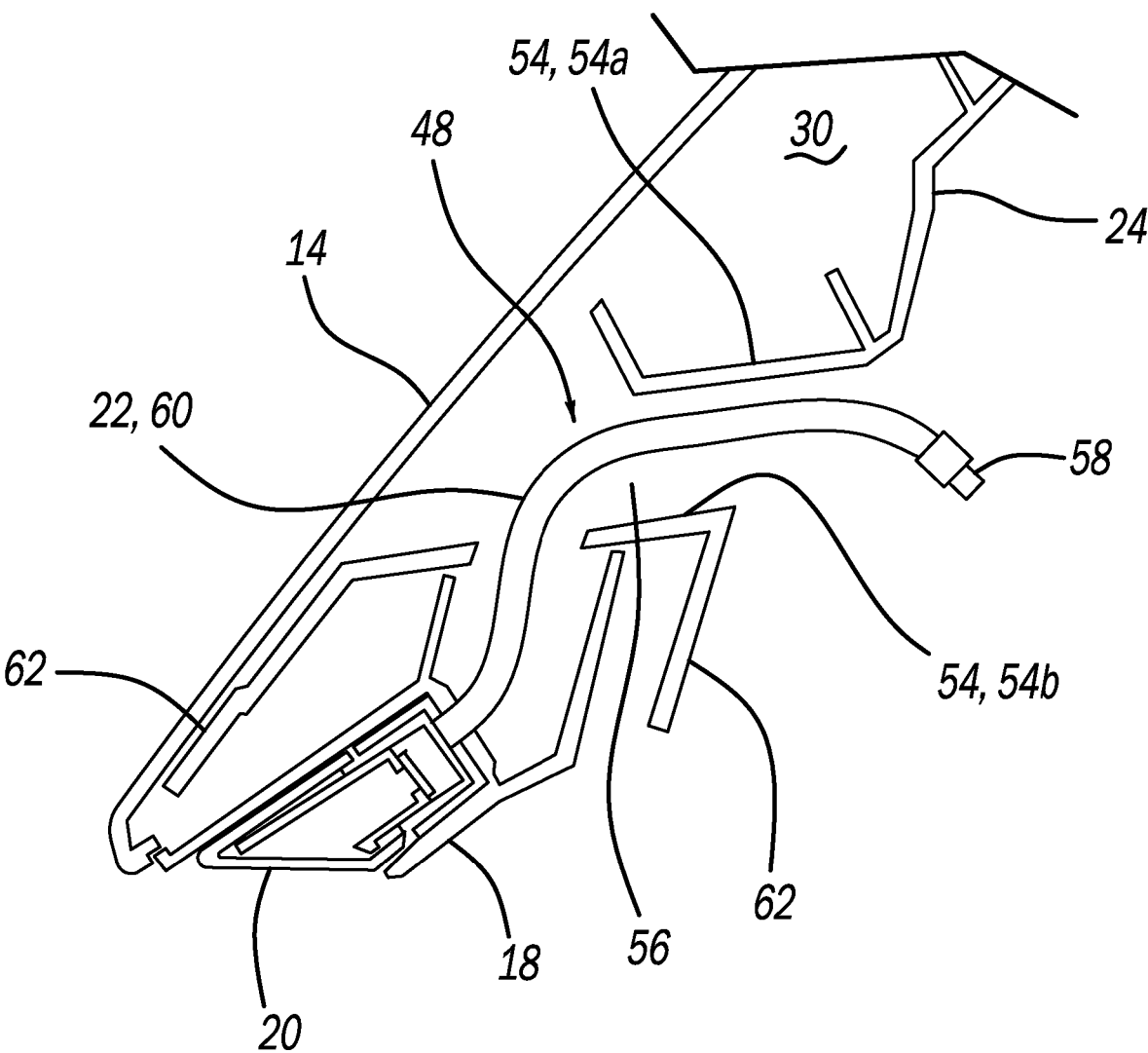

FIG. 7 is a partial perspective cross-sectional view illustrating the connection between the stop lamp assembly shown in FIG. 4 when attached to the portion of the tailgate inner panel illustrated in FIG. 6; and FIG. 8 is partial cross-sectional view illustrating the connection between the stop lamp assembly shown in FIG. 4 when attached to the portion of the tailgate inner panel illustrated in FIG. 6.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1, 2 and 4-8, a vehicle 10 having a tailgate 11 according to the present disclosure is illustrated. Tailgate 11 includes an improved tailgate inner panel 24, which assists the operator in locating the stop lamp wiring harness 22 relative to tailgate inner panel 24 and connecting stop lamp wiring harness 22 to a main wiring harness 32 (FIG. 4) that is attached to tailgate inner panel 24.

Figure 1:
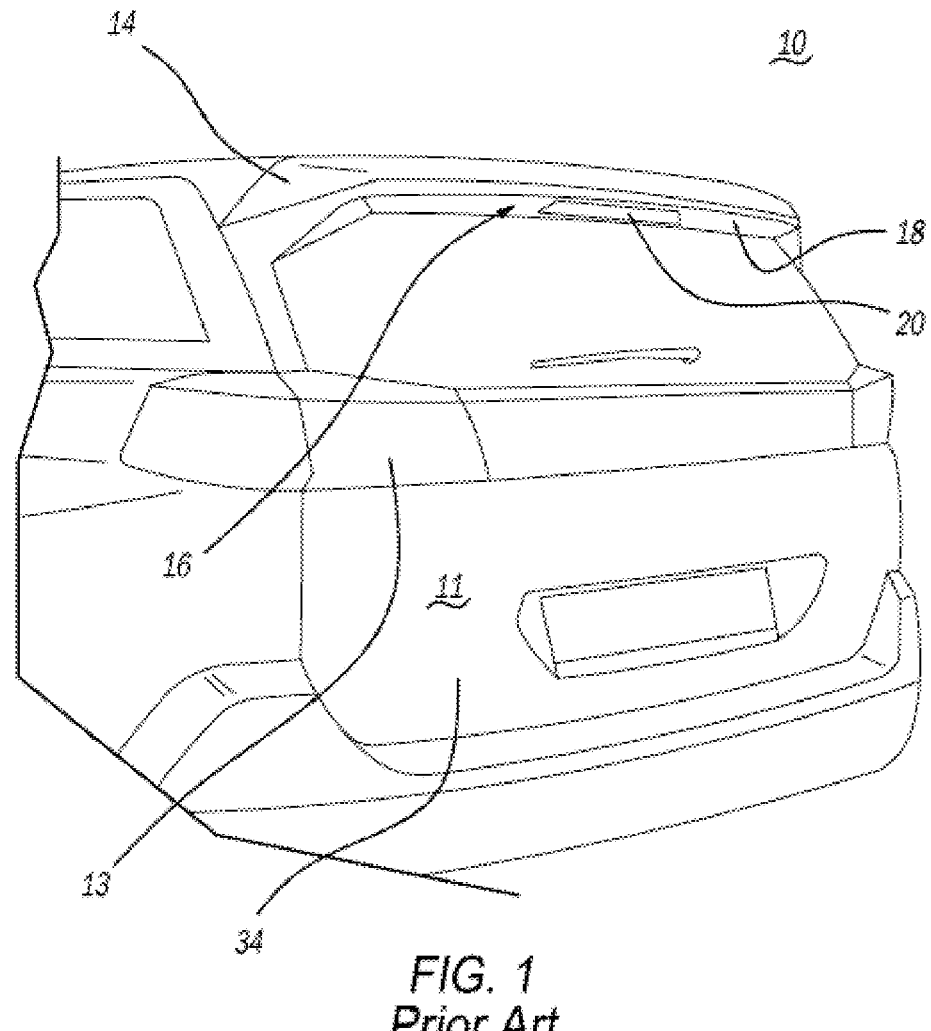
FIG. 1 is a partial perspective view of a vehicle according to a principle of the present disclosure.
Figure 2:
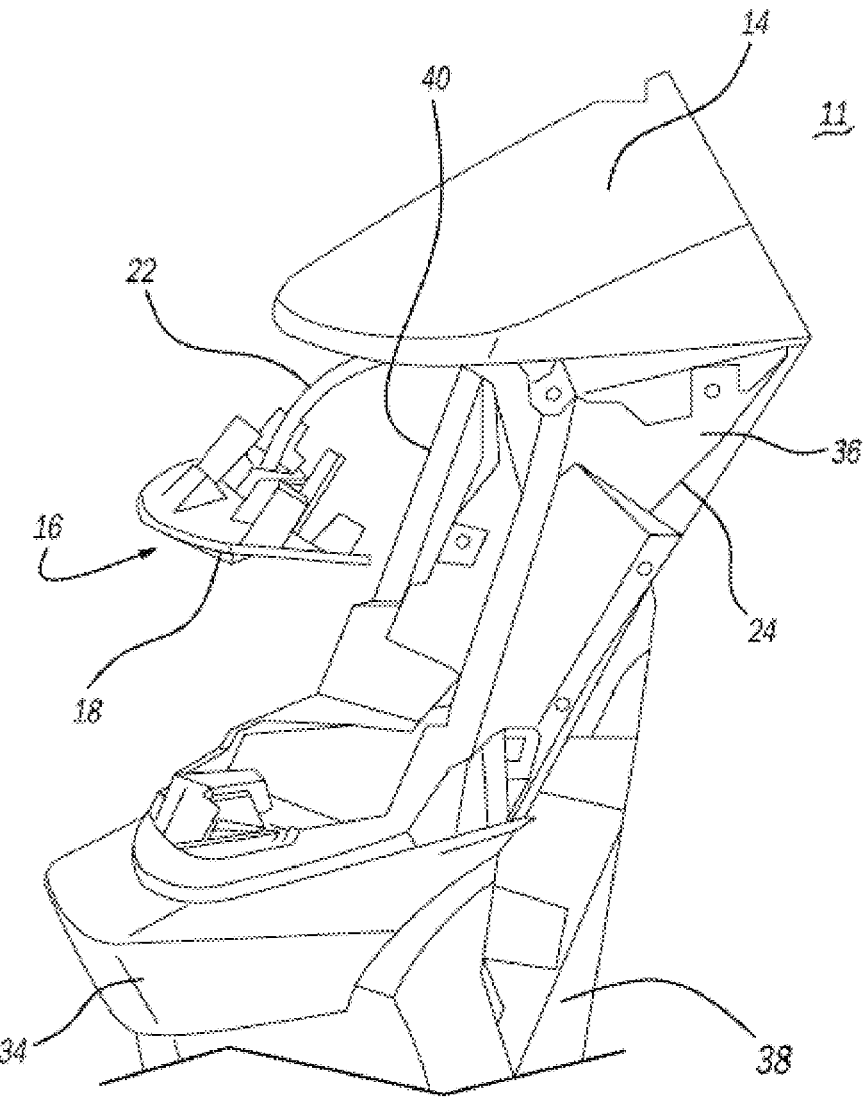
FIG. 2 is partial perspective view of a tailgate of the vehicle illustrated in FIG. 1.

In the illustrated embodiment, tailgate 11 includes upper spoiler 14, stop lamp assembly 16, and tailgate inner panel 24. Upper spoiler 14 is an exterior panel that is connected to tailgate inner panel 24. As shown in FIG. 1, tailgate 11 also includes a lower exterior panel 34 that may be attached to tailgate inner panel 24.

Tailgate inner panel 24 includes an upper section 36 that is configured to mate with upper spoiler 14 and a lower section 38 that is configured to mate with lower exterior panel 34. Tailgate inner panel 24 may define an opening 40 that is configured for receipt of a rear glass panel (not shown) that permits a driver of vehicle 10 to see through the tailgate 11 while operating vehicle 10. Upper section 36 is best illustrated in FIGS. 4-7.

Figure 5:
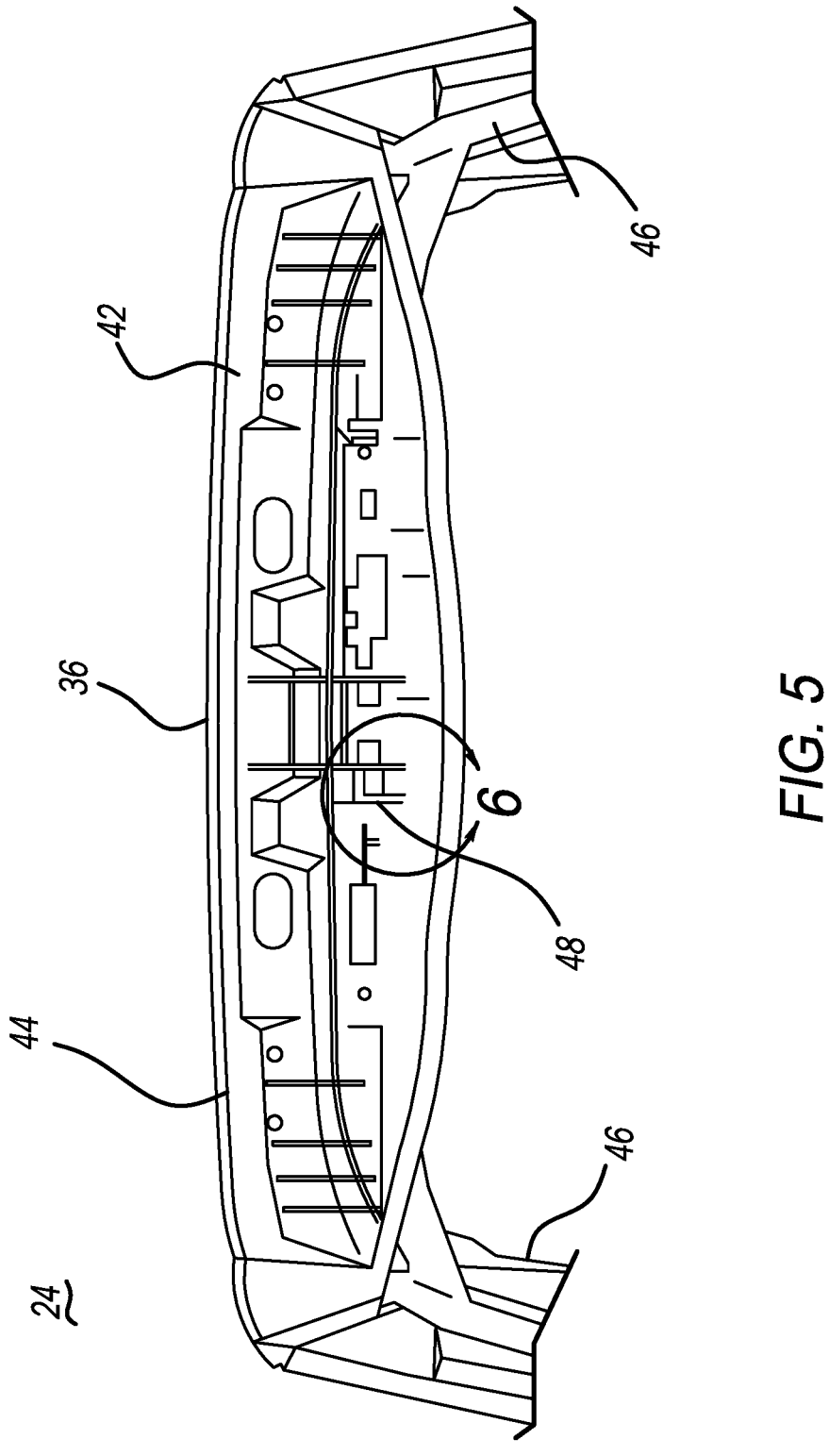
FIG. 5 is a partial perspective view of a tailgate inner panel according to a principle of the present disclosure.

FIGS. 5 and 6 illustrate upper section 36 of tailgate inner panel 24 in a state where upper spoiler 14 and stop lamp assembly 16 are not attached thereto. When referring to FIGS. 5 and 6, it should be understood that upper section 36 is being viewed from an interior of vehicle 10. Inner panel 24 includes a body 42 that defines each of upper section 36 and lower section 38. In the illustrated embodiment, upper section 36 of body 42 includes a transverse panel 44 having a pair of side panels 46 integral therewith that attach to lower section 38 (not shown in FIGS. 5 and 6).

Stop lamp assembly 16 is designed to be mated with transverse panel 44. To provide access for stop lamp wiring harness 22 when stop lamp assembly 16 is mated with transverse panel 44, transverse panel 44 includes a tunnel structure 48 that, when tailgate 11 is being assembled, an operator can insert stop lamp wiring harness 22. Tunnel structure 48 includes a first opening 50 and a second opening 52, and a plurality of barrier walls 54 that connect first opening 50 and second opening 52.

Figure 3:
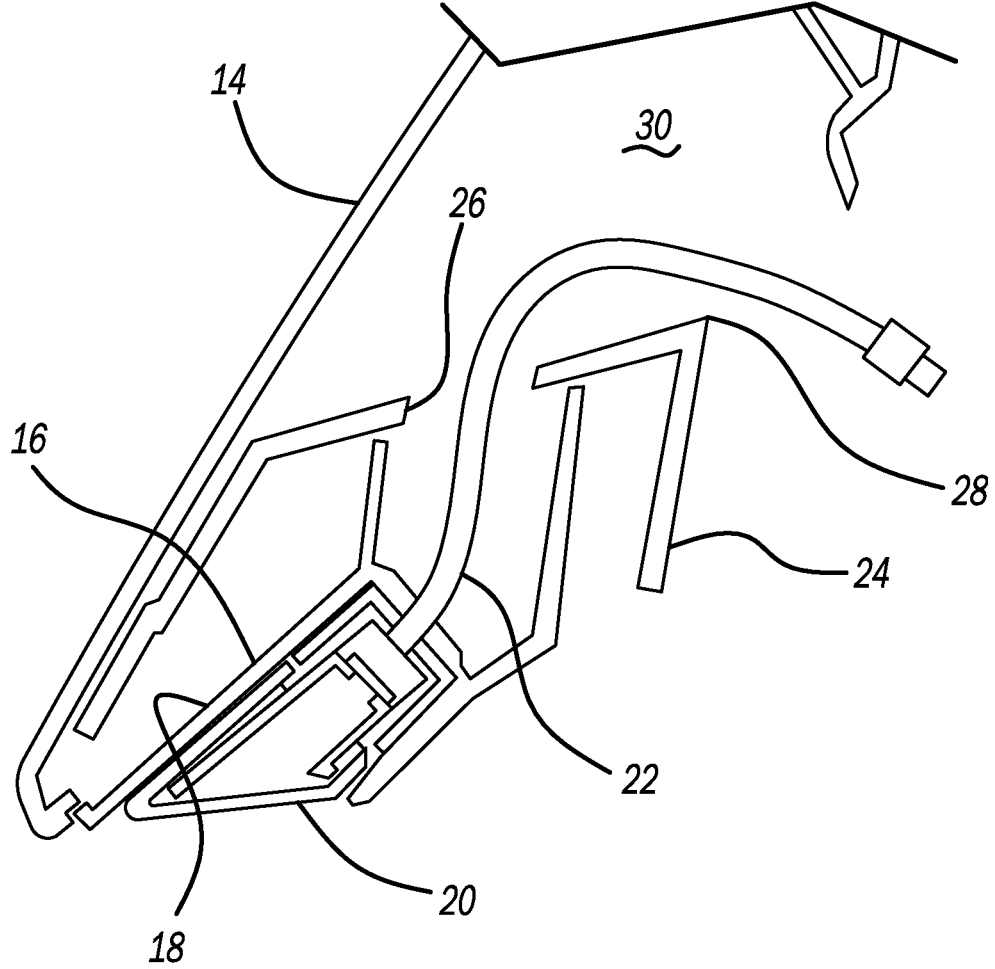
FIG. 3 is a partial cross-sectional view of a prior art tailgate.

Again referring to the prior art tailgate 11 shown in FIG. 3 and as described in the background section of the application, when the prior art tailgate 11 is being assembled the operator must first pass the stop lamp wiring harness 22 through the first aperture 26 and then the second aperture 28 before attaching the lower spoiler body 18 to the tailgate inner panel 24. Inasmuch as the second aperture 28 is not visible to the operator during this process, this process is not very efficient as the operator may be required to take an inordinate amount of time to locate and pass the stop lamp wiring harness 22 through the second aperture 28 before it can be mated with the main wiring harness (not shown) because there is an open space 30 located between the first aperture 26 and the second aperture 28 that the stop lamp wiring harness 22 can travel into, which makes locating the second aperture 28 difficult. Tunnel structure 48 provides a defined pathway 56 that prevents stop lamp wiring harness 22 from travelling into space 30. Accordingly, even though the operator cannot see the second opening 52 when inserting stop lamp wiring harness 22 into tailgate inner panel 24, the barrier walls 54 guide stop lamp wiring harness 22 in a direction toward second opening 52.

As noted above, tunnel structure 48 includes barrier walls 54 that connects first opening 50 and second opening 52, which assist in guiding stop lamp wiring harness 22 between first opening 50 and second opening 52. Barrier walls include an upper wall 54a, a lower wall 54b, and a pair of side walls 54c that connect upper wall 54a and lower wall 54b.

To assembly tailgate 11, upper spoiler 14 and lower exterior panel 34 are attached to tailgate inner panel 24. Stop lamp assembly 16 including lower spoiler body 18, stop lamp 20, and a stop lamp wiring harness 22 is separately assembled. Tailgate 11 including tailgate inner panel 24, upper spoiler 14, and lower exterior panel 34 may be manufactured in a first facility and stop lamp assembly 16 may be assembled in a separate second facility. Alternatively, these components may be manufactured in the same facility. Regardless, stop lamp assembly 16 eventually needs to be mated with tailgate inner panel 24 during the assembly process of tailgate 11.

To mate stop lamp assembly 16 with tailgate inner panel 24, stop lamp assembly 16 is lifted in a direction toward transverse panel 44. Before mating stop lamp assembly 16 with traverse panel 44, stop lamp wiring harness 22 is fed by operator through first opening 50. Once a connection portion 58 of stop lamp wiring harness 22 is passed through first opening 50, connection portion 58 may be urged along pathway 56 by the operator pushing a cable 60 of stop lamp wiring harness 22 into first opening 50. The cable 60, while flexible, is also rigid to an extent that the operator pushing cable 60 into first opening 50 also advances connection portion 58 along pathway 56 in a direction toward second opening 52. Put another way, the rigidity of cable 60 should prevent cable 60 from bunching up in tunnel structure 48 and not reaching second opening 52.

As connection portion 58 is urged along pathway 56, barrier walls 54 serve as a guide that directs connection portion 58 toward second opening 52. After connection portion 58 has traveled through pathway 56 and through second opening 52, the operator may grasp the connection portion 58 and mate the connection portion 58 with the main wiring harness 32. After connection portion 58 is mated with main wiring harness 32, stop lamp assembly 16 may be inserted into an elongated recess 62 of tailgate inner panel 24 defined by downwardly extending flanges 64 and clipped to tailgate inner panel 24.

According to the above-described configuration and assembly method, the stop lamp wiring harness 22 is more easily passed through the tailgate inner panel 24 by the operator assembling the tailgate 11. In this regard, the time necessary to pass stop lamp wiring harness 22 through first opening 50 and second opening 52 is substantially reduced due to barrier walls 54 serving as guides for stop lamp wiring harness 22 toward second opening 52. Accordingly, manufacturing costs and time can be reduced and efficiency improved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tailgate for a vehicle, comprising:
a tailgate inner panel having a body defining a transversely extending panel having a pair of side panels integral therewith;
a stop lamp assembly including a stop lamp and a stop lamp wiring harness configured to provide electricity to the stop lamp, the stop lamp assembly configured to mate with the tailgate inner panel;
wherein the tailgate inner panel includes a first opening and a second opening in communication with each other via an enclosed tunnel structure configured for receipt of the stop lamp wiring harness,
wherein the enclosed tunnel structure is defined by a plurality of barrier walls that define an enclosed pathway for the stop lamp wiring harness to pass through the tailgate inner panel,
wherein the barrier walls include an upper wall and a lower wall that are connected to each other by a pair of sidewalls, and
wherein the barrier walls are each positioned between the pair of side panels.

2. The tailgate according to claim 1, further comprising an upper spoiler connected to the tailgate inner panel.

3. The tailgate according to claim 2, wherein the stop lamp assembly includes a lower spoiler body that mates with the upper spoiler.

4. The tailgate according to claim 1, wherein the stop lamp wiring harness includes a cable attached to the stop lamp.

5. The tailgate according to claim 1, wherein the tailgate inner panel includes a body defining an elongated recess configured for receipt of the stop lamp assembly.

6. A vehicle, comprising:
a tailgate including:
a tailgate inner panel including an upper section and a lower section, and having a body defining a transversely extending panel having a pair of side panels integral therewith;
an upper spoiler attached to the upper section;
a lower exterior panel connected to the lower section; and
a stop lamp assembly including a stop lamp and a stop lamp wiring harness configured to provide electricity to the stop lamp, the stop lamp assembly configured to mate with the upper section;
wherein the upper section of the tailgate inner panel includes a first opening and a second opening in communication with each other via an enclosed tunnel structure configured for receipt of the stop lamp wiring harness, wherein the enclosed tunnel structure is defined by a plurality of barrier walls that define an enclosed pathway for the stop lamp wiring harness to pass through the tailgate inner panel, wherein the barrier walls include an upper wall and a lower wall that are connected to each other by a pair of sidewalls, and wherein the barrier walls are each positioned between the pair of side panels.

7. The vehicle according to claim 6, wherein the stop lamp assembly includes a lower spoiler body that mates with the upper spoiler.

8. The vehicle according to claim 6, wherein the stop lamp wiring harness includes a cable attached to the stop lamp.

9. The vehicle according to claim 6, wherein the upper section of the tailgate inner panel includes a body defining an elongated recess configured for receipt of the stop lamp assembly.

\* \* \* \* \*